(12) United States Patent
Takeda et al.

(10) Patent No.: US 7,817,689 B2
(45) Date of Patent: Oct. 19, 2010

(54) LASER SOURCE DEVICE, DISPLAY DEVICE, AND PROJECTOR

(75) Inventors: Takashi Takeda, Suwa (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 887 days.

(21) Appl. No.: 11/425,286

(22) Filed: Jun. 20, 2006

(65) Prior Publication Data
US 2006/0285076 A1    Dec. 21, 2006

(30) Foreign Application Priority Data
Jun. 20, 2005    (JP) .............. 2005-179253

(51) Int. Cl.
*H01S 3/04* (2006.01)
*H01S 3/10* (2006.01)
(52) U.S. Cl. .............. 372/36; 372/22; 372/34
(58) Field of Classification Search ........... None
See application file for complete search history.

(56) References Cited

U.S. PATENT DOCUMENTS

| | | | |
|---|---|---|---|
| 4,860,304 A | | 8/1989 | Mooradian |
| 4,953,166 A | | 8/1990 | Mooradian |
| 5,031,184 A | * | 7/1991 | Greve et al. ........... 372/34 |
| 5,105,429 A | * | 4/1992 | Mundinger et al. ...... 372/34 |
| 5,115,445 A | | 5/1992 | Mooradian |
| 5,185,752 A | * | 2/1993 | Welch et al. ........... 372/22 |
| 5,256,164 A | | 10/1993 | Mooradian |
| 5,265,116 A | | 11/1993 | Mooradian |
| 5,267,252 A | * | 11/1993 | Amano ................. 372/34 |
| 5,363,391 A | * | 11/1994 | Matthews et al. ....... 372/36 |
| 5,365,539 A | | 11/1994 | Mooradian |
| 5,402,437 A | | 3/1995 | Mooradian |
| 5,838,709 A | | 11/1998 | Owa |
| 6,404,797 B1 | * | 6/2002 | Mooradian ............. 372/96 |
| 7,322,704 B2 | * | 1/2008 | Shchegrov ............. 372/22 |
| 2006/0023173 A1 | | 2/2006 | Mooradian et al. |
| 2006/0023757 A1 | | 2/2006 | Mooradian et al. |
| 2006/0268241 A1 | | 11/2006 | Watson et al. |
| 2006/0280219 A1 | | 12/2006 | Shchegrov |
| 2007/0153862 A1 | | 7/2007 | Shchegrov et al. |
| 2007/0153866 A1 | | 7/2007 | Shchegrov et al. |

FOREIGN PATENT DOCUMENTS

JP    A-04-241484    8/1992

(Continued)

OTHER PUBLICATIONS

A. Mooradian et al., "High Power Extended Vertical Cavity Surface Emitting Diode Lasers and Arrays and Their Applications", Micro-Optics Conference, Tokyo, (Nov. 2, 2005) pp. 1-4.

*Primary Examiner*—Minsun Harvey
*Assistant Examiner*—Sean Hagan
(74) *Attorney, Agent, or Firm*—Oliff & Berridge, PLC (57) ABSTRACT

A laser source device includes: a plurality of lasers; wavelength converting elements that convert wavelengths of a plurality of light beams emitted from the plurality of lasers; a temperature sensor that detects the temperatures of the wavelength converting elements; and a temperature controlling unit that controls the temperatures of the wavelength converting elements on the basis of an output of the temperature sensor.

13 Claims, 6 Drawing Sheets

FOREIGN PATENT DOCUMENTS

| | | |
|---|---|---|
| JP | A-05-235441 | 9/1993 |
| JP | A-06-500432 | 1/1994 |
| JP | A-09-246648 | 9/1997 |
| JP | A-2001-267670 | 9/2001 |
| JP | A-2001-272705 | 10/2001 |
| JP | A-2003-124567 | 4/2003 |
| JP | A-2003-298180 | 10/2003 |
| JP | A-2004-069901 | 3/2004 |
| JP | A-2005-50847 | 2/2005 |
| JP | A-2005-099160 | 4/2005 |

* cited by examiner

LASER SOURCE DEVICE, DISPLAY DEVICE, AND PROJECTOR

BACKGROUND

1. Technical Field

The present invention relates to a laser source device, a display device, and a projector.

2. Related Art

In increasing demand of miniaturization of a projector in recent years, a projector or a display using a laser source has been discussed in association with increase in output of semiconductor laser, and appearance of blue semiconductor laser. They have a large potential as a display element in the next generation since a wavelength band of the light source is narrow and hence the range of color reproduction can be significantly enlarged, and also miniaturization and reduction of components are possible.

As the light sources of the display element, laser sources in three colors of R (red), G (green), and B (blue) are necessary. Although vibration sources exist in the semiconductor laser for R and B, the vibration source does not exist for G, and hence it is considered to utilize a second higher harmonic wave generated when an infrared laser is entered into a nonlinear optical element (wavelength converting element: SHG) (for example, see JP-A-2001-267670).

A laser beam generating device utilizing the wavelength converting element provided with a temperature control element for enhancing and stabilizing efficiency of generation of the laser beam is considered (for example, see JP-A-5-235441).

However, with a light source having a plurality of lasers arranged in an array, which is a laser beam generating device utilizing the wavelength converting element, the conversion efficiency is abruptly lowered when the temperature of the wavelength converting element is changed from a desired value. Therefore, a specific temperature control is required. However, in the related art, a technique to control the temperature has not been developed yet in the laser beam generating device provided with the wavelength converting element and the structure with the arrayed laser. It is in fact a difficult technique to control the temperature accurately for each of the plurality of lasers arranged in an array, and is difficult to realize while constraining increase in manufacturing cost.

SUMMARY

An advantage of some aspects of the invention is to provide a laser source device, a display device, and a projector in which temperature control can be achieved adequately in a light source device having a plurality of lasers arranged in an array and a wavelength converting element.

Another advantage of some aspects of the invention is to provide a laser source device, a display device, and a projector in which temperature control can be achieved adequately and efficiently in the light source device having the plurality of lasers arranged in an array and the wavelength converting element while constraining increase in manufacturing cost.

A laser source device according to an aspect of the invention includes a plurality of lasers, wavelength converting elements that convert wavelengths of a plurality of light beams emitted from the plurality of lasers, a temperature sensor that detects the temperatures of the wavelength converting elements, and temperature controlling means that controls the temperatures of the wavelength converting elements on the basis of an output of the temperature sensor.

In this arrangement, for example, each one of the plurality of laser beams can be converted in wavelength by a single wavelength converting element, and the one wavelength converting element can be controlled in temperature by a set of the temperature sensor and the temperature controlling means. Then, the temperature can be controlled with higher efficiency in comparison with the structure in which one wavelength converting element is arranged for each laser and the temperature sensor and the temperature controlling means are arranged for each wavelength converting element for controlling the temperature, whereby the conversion efficiency of the wavelength converting elements can be maintained at a desired value level or even higher. In a high-density arrangement of the respective lasers such that intervals of the lasers are, for example, 1 mm or less, it is difficult to arrange the temperature sensor and the temperature controlling means for each laser in terms of manufacturing technique, and increase in manufacturing cost is resulted. According to an aspect of the invention, the laser source device that can control the temperature of the wavelength converting elements preferably even in the high-density arrangement can be provided at a low cost. The temperature controlling means according to the aspect of the invention may be provided with a heating or cooling unit as a Peltier element or a circuit unit that controls and drives the unit.

Preferably, the plurality of lasers constitute laser arrays in which the lasers are arranged to form one or more rows on the same substrate, and the wavelength converting element is a waveguide type wavelength converting element and is formed into one or more mono-structures that light beams emitted from the plurality of lasers that are arranged into one or more rows commonly enter.

In this arrangement, the wavelengths of the plurality of laser beams emitted from the laser arrays can be converted by the wavelength converting element of a single mono-structure. The temperature of the single wavelength converting element can be controlled by a set of the temperature sensor and the temperature controlling means. Consequently, the light source having the laser arrays and the wavelength converting elements can be controlled in temperature efficiently and adequately while restricting increase in manufacturing cost.

Preferably, the plurality of lasers constitute two-dimensional laser arrays arranged so as to form a plurality of rows on the same substrate, the wavelength converting elements are a plurality of mono-structures each arranged for each two-dimensional laser array, the mono-structures are arranged so that light beams emitted from the plurality of lasers arranged in an array enter commonly, the temperature sensor and the temperature controlling means are arranged for each mono-structure arranged for each array, and the temperature controlling means arranged for each mono-structure controls the temperature of the mono-structure on the basis of an output from the temperature sensor arranged on the same mono-structure.

Figure 1:
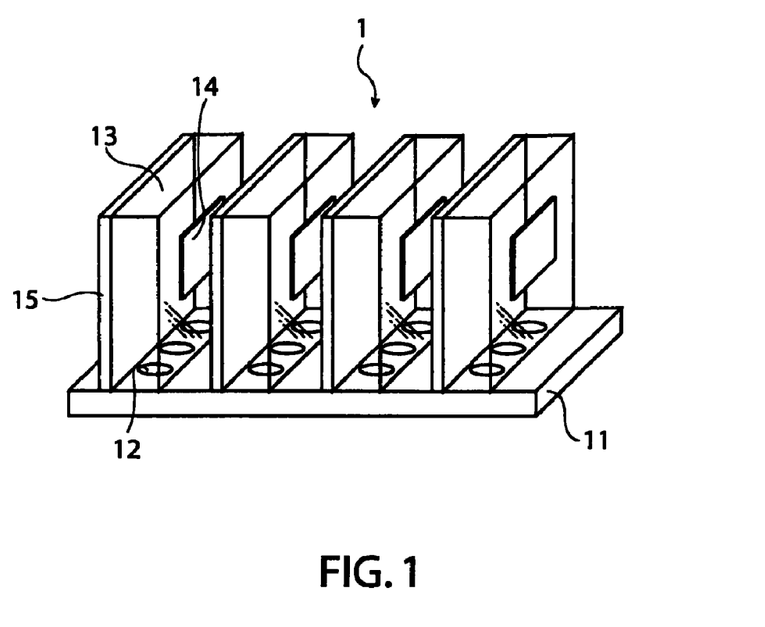
FIG. 1 is a schematic perspective view showing an example of a laser source device according to a first embodiment of the invention.

In this arrangement, the structure in which the wavelength converting element is arranged for each two-dimensional laser array, that is, the structure in which the wavelength converting elements are arranged so as to assume an arrangement of elongated square members (see FIG. 1). The waveguide type wavelength converting element is generally formed into a plate shape, and it is difficult to increase the thickness of the plate shape in terms of manufacturing technique. Therefore, a structure in which the laser beam enters from an end surface of the plate shape of the wavelength converting element (for example, an elongated rectangular area). Accordingly, even when the area for arranging the respective lasers in the two-dimensional laser array is large in width, it is not necessary to forcedly increase the thickness of the single wavelength converting element. Therefore, the efficient and adequate temperature control can be achieved for the light source including the two-dimensional laser array and the wavelength converting element while restraining the increase in manufacturing cost.

Preferably, the wavelength converting element is formed into a plate shape, and an end surface of the plate shape is arranged so as to oppose light emitting ports of the plurality of lasers that constitute the laser array or the two-dimensional laser array, the temperature sensor is arranged on one plane of the plate shape of the wavelength converting element, a heating or cooling unit of the temperature controlling means is arranged on a plane on the other side of the plate shape of the wavelength converting element.

In this arrangement, each of the plurality of wavelength converting elements arranged so as to assume an arrangement of elongated square members can be controlled in temperature. Therefore, for example, even when the wavelength or the temperature characteristics of the laser beam is different for each two-dimensional laser array, the temperature control can be achieved for each array, and hence the conversion efficiencies of the wavelength converting elements in the respective arrays can be maintained at a desired level or even higher.

Preferably, the laser source device according to an aspect of the invention includes heat-shielding structures or clearances arranged between the adjacent wavelength converting elements (mono-structures) arranged for the respective two-dimensional laser arrays.

In this arrangement, the temperatures of the wavelength converting elements in the respective arrays can be controlled on the basis of different reference temperatures. Therefore, for example, even when the wavelength or the temperature characteristics are different for each two-dimensional laser array, the conversion efficiencies of the wavelength converting elements in all of the arrays can be maintained at a desired level or even higher.

Preferably, the laser source device according to the aspect of the invention includes heat conductive members, which are members of low heat resistance, arranged between the adjacent wavelength converting elements (mono-structures) arranged for the respective two-dimensional laser arrays.

In this arrangement, the respective wavelength converting elements can be thermally connected by the heat conductive members, and hence the temperatures of the respective wavelength converting elements can be equalized. Therefore, for example, when the wavelengths and the temperature characteristics of the lasers in the respective two-dimensional laser arrays are almost the same, the conversion efficiency for all the wavelength converting elements can be enhanced to desired levels or even higher.

Preferably, the laser source device according to the aspect of the invention includes a heat conductive member having a plurality of through-holes in which the wavelength converting elements and the temperature sensors arranged for the respective two-dimensional laser arrays are inserted, and the wavelength converting elements and the heat conductive members are thermally adhered to side surfaces of the through-holes.

In this arrangement, the heat conductive members can be in tight adhesion with most parts of exposed surface of the respective wavelength converting elements. Therefore, the temperatures of the respective wavelength converting elements can be equalized at a desired level.

Preferably, the heat conductive member is formed of a copper plate, and a heating or cooling unit of the temperature controlling means is adhered to the copper plate.

In this arrangement, the conversion efficiency of the wavelength converting elements for the two-dimensional laser arrays can be enhanced to desired levels or even higher while restricting the increase in manufacturing cost.

Preferably, the plurality of lasers constitute a two-dimensional laser arrays dispersed on a two-dimensional plane on the same substrate, and the wavelength converting elements is a single mono-structure that light beams emitted from all the plurality of lasers that constitute the two-dimensional laser arrays enter commonly.

In this arrangement, the wavelengths of all the laser beams emitted from the two-dimensional laser arrays can be converted by the single wavelength converting element. Then, the temperature of the single wavelength converting element can be controlled by a set of the temperature sensor and the temperature controlling means. Therefore, the invention can achieve miniaturization and high-efficiency of the laser source device.

Preferably, the laser source device according to the aspect of the invention includes a laser temperature sensor for detecting the temperature of the lasers and laser temperature controlling means that controls the temperature of the lasers on the basis of an output from the laser temperature sensor.

In this arrangement, the temperature control of the laser can be achieved separately from the temperature control of the wavelength converting elements. Therefore, for example, the temperature can be controlled so that the lasers can emit laser beams with wavelengths with high conversion efficiency for the wavelength converting elements, whereby the conversion efficiency of the wavelength converting elements can further be improved stably.

A display device according to another aspect of the invention includes the laser source device.

In this arrangement, the display device in which a high-definition and high-quality display is enabled and miniaturization and reduction of power consumption are achieved can be provided at a low cost.

Preferably, a display device according to further aspect of the invention is a scanning display device including a red light source, a green light source, a blue light source and a scanning unit that scans light beams from the light sources of the respective colors to display a screen image, wherein the light source of at least one color includes the laser source device.

In this arrangement, the display device in which a high-definition and high-quality full color display is achieved, and miniaturization, reduction of power consumption and cost are realized is provided.

A projector according to an aspect of the invention includes the laser source device, a light modulating device that modulates a light beam emitted from the laser source device, and a projecting device that projects the light beam modulated by the light modulating device.

In this arrangement, the projector in which a high-definition and high-quality full color display is achieved, and miniaturization and reduction of power consumption are realized can be provided at a low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following embodiments of the invention will be described with reference to drawings. Each of the components in the following drawings is suitably sealed for display in order to be seen easily.

First Embodiment

FIG. 1 is a schematic perspective view showing an example of a laser source device according to a first embodiment of the invention. A laser source device 1 in the first embodiment is a device which serves as a light source for various devices such as a display device, an optical communication device, an audio device, and an information processing device. The laser source device 1 includes a substrate 11, lasers 12, wavelength converting elements (SHG) 13, a temperature sensor 14, and Peltier elements 15.

The substrate 11 is, for example, a substrate formed of a semiconductor. The lasers 12 include lasers arranged on the substrate 11 in an array. A plurality of the lasers 12 arranged so as in rows and columns on a surface of the substrate 11 constitute a laser array (two-dimensional laser array). For example, a surface-emission type laser is applied as the lasers 12. The surface-emission type laser emits laser beams from the surface of the semiconductor substrate (substrate 11), and is characterized in that laser emitting angles are directed in the same direction and are small. The laser 12 may be the surface-emission type laser which can emit, for example, infrared laser beams.

The wavelength converting element 13 is an element that converts the wavelength of the laser beams emitted from the lasers 12, that is, converts the wavelength of the infrared laser beam into about a half to create a green laser beam. In this application, a plate-shaped waveguide type is used as the wavelength converting element 13. When the waveguide type wavelength converting element 13 is employed, since the thickness of the wavelength converting element 13 is thin, a cycle polarization and inversion structure can easily be formed, and hence the efficiency of converting the wavelength can be enhanced easily, whereby manufacturing cost can be reduced.

The wavelength converting elements 13 are composed of mono-structures each arranged for each two-dimensional laser array composed of the plurality of lasers 12. The respective wavelength converting elements 13 are arranged so that light beams emitted from a row of the plurality of lasers 12 arranged in the two-dimensional laser arrays commonly enter. In other words, the respective wavelength converting elements 13 are arranged in such a manner that plate-shaped end surfaces (bottom surfaces) of the wavelength converting elements 13 face the light exit ports of the row of the plurality of lasers 12 of the two-dimensional laser array. The respective wavelength converting elements 13 are arranged at constant intervals from each other in parallel so as to assume an arrangement of elongated square members.

Light converging means such as a lens array can be arranged between the laser 12 and the wavelength converting element 13. The lens array preferably has a function to bring light beams emitted from the lasers 12 into substantially parallel or converged state. The light converging means may also be a hologram array, a Fresnel lens array, or the like in addition to the lens array.

The temperature sensors 14 are mounted to the respective wavelength converting elements 13, and detect the temperature of the respective wavelength converting elements 13. Various sensors can be applied as the temperature sensor 14 and, for example, a temperature sensor utilizing temperature dependency of electric resistance of metal or a semiconductor, or a temperature sensor utilizing Seebeck Effect of the thermocouple or the semiconductor can be applied. In this embodiment, the temperature sensors 14 are arranged on planes of the plate shapes of the wavelength converting elements 13 on one side, and the Peltier elements 15 are arranged on planes of the plate shapes of the wavelength converting elements 13 on the opposite sides.

The Peltier elements 15 are mounted to the respective wavelength converting elements 13, and each serves as a part of temperature controlling means that controls the temperature of the corresponding wavelength converting element 13 on the basis of an output from the temperature sensor 14 mounted thereto. In other words, the Peltier element 15 heats up or cools down the wavelength converting element 13 and increases or decreases the temperature on the basis of the temperature sensor 14 arranged on the corresponding wavelength converting element 13. The Peltier element 15 is in thermally adhered to the wavelength converting element 13. In other words, the Peltier element 15 is bonded to the wavelength converting element 13 via a member of high heat conductivity. It is also possible to apply various cooling means or heating means instead of the Peltier element 15. For example, a fan, a heater, and cooling medium circulating means can also be applied.

As shown above and in FIG. 1, the laser source device 1 includes the lasers 12 compose the surface-emission type lasers. However, the laser source device 1 may employ end surface emission type lasers as the lasers 12. In other words, the laser source device 1 may be composed of a combination of the end surface emission type laser arrays and the waveguide type wavelength converting elements 13.

For example, the laser source device 1 may be configured as shown below. A plurality of end surface light-emitting type lasers are arranged on one side of the substrate (sub-board) to constitute a one-dimensional laser array. The sub-board is mounted to a plane of the main board so that light emission of the one-dimensional laser array is directed orthogonally to the plane of the main board (corresponding to the substrate 11). A plurality of the sub-boards are arranged at regular intervals (corresponding to the distances between the respective adjacent wavelength converting elements 13 in FIG. 1) on the main board. The one-dimensional laser arrays on the respective sub-boards are mounted to members (which may be formed either integrally or separately from the main board) serving both as a laser mounting member and a heat sink. The respective sub-boards and the waveguide type wavelength converting elements (corresponding to the wavelength converting elements 13 in FIG. 1) are connected in such a manner that the light-emitting portions of the respective one-dimensional laser arrays (end surfaces of the sub-boards) and the end surfaces of the waveguide type wavelength converting elements come into direct contact with each other. It is also possible to employ bulk type wavelength converting elements instead of the waveguide type wavelength converting elements. A structure in which optical components (coupling lens, light converting means, etc.) such as lenses can be provided between the light emitting portions of the one-dimensional laser array and the end surfaces of the wavelength converting elements may also be applicable.

Other structures of the laser source device utilizing the end surface light-emitting type laser can be configured as those in the laser source device 1 shown in FIG. 1. In other words, the respective wavelength converting elements are provided with the temperature sensors 14 and the Peltier elements 15 respectively.

Figure 2:
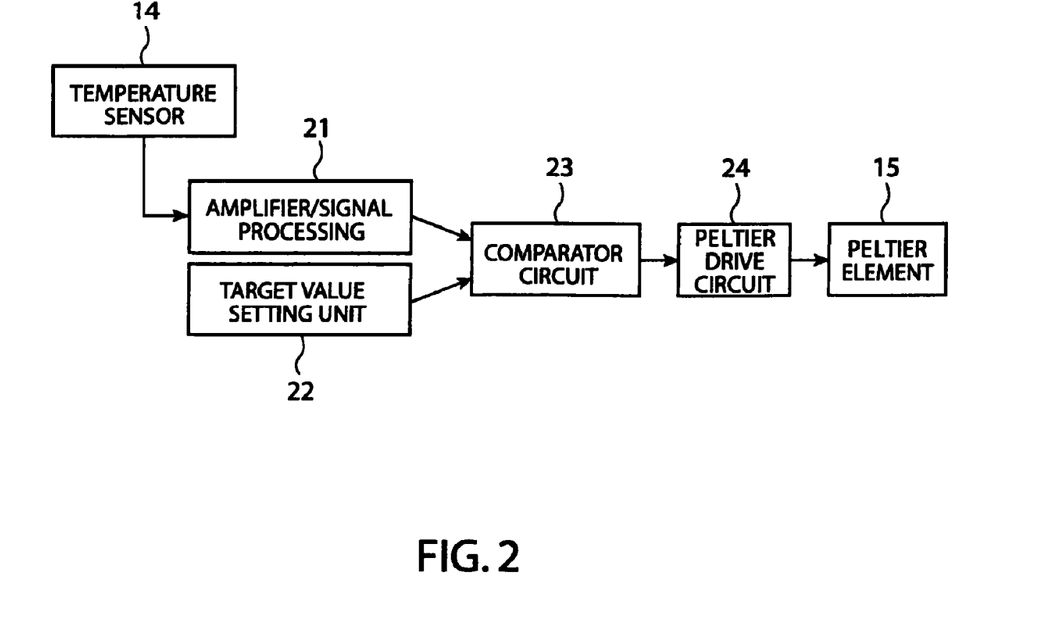
FIG. 2 is a circuit drawing showing an example of temperature controlling means of the laser source device shown in FIG. 1.

FIG. 2 is a circuit drawing showing an example of the temperature controlling means of the laser source device 1 shown in FIG. 1. In FIG. 2, the same components as the laser source device 1 shown in FIG. 1 are represented by the same reference numerals. The temperature controlling means in the first embodiment includes the temperature sensor 14, the Peltier element 15, an amplifier/signal processing unit 21, a target value setting unit 22, a comparator circuit 23 and a Peltier drive circuit 24.

The amplifier/signal processing unit 21 is a circuit for amplifying an input signal and performing signal processing. The target value setting unit 22 is a circuit that outputs a temperature of the wavelength converting element 13 at which the conversion efficiency of the wavelength converting element 13 becomes the maximum value (target temperature) as a voltage (target voltage). The comparator circuit 23 includes, for example, an operational amplifier or a comparator, which compares an output signal from the amplifier/signal processing unit 21 and an output signal of the target value setting unit 22, and outputs a signal according to the result of comparison. The Peltier drive circuit 24 is a circuit that supplies a current of a magnitude and a direction on the basis of the output from the comparator circuit 23 to the Peltier element 15. The set of the temperature controlling means shown in FIG. 2 is provided for each wavelength converting element 13. The amplifier/signal processing unit 21, the target value setting unit 22, the comparator circuit 23, and the Peltier drive circuit 24 of each set may be formed as an integrated circuit on the substrate 11.

Subsequently, an operation of the temperature controlling means according to an aspect of the invention will be described. The temperature sensor 14 outputs a signal according to the temperature of the wavelength converting element 13 on which the temperature sensor 14 is mounted. The signal outputted from the temperature sensor 14 is converted into a voltage proportional to the temperature in the amplifier/signal processing unit 21. On the other hand, the target value setting unit 22 generates a target voltage corresponding to the target temperature of the wavelength converting element 13.

The comparator circuit 23 compares the output voltage from the amplifier/signal processing unit 21 and the target voltage of the target value setting unit 22. The comparator circuit 23 outputs a voltage lower than a predetermined reference voltage to the Peltier drive circuit 24 when the output voltage of the amplifier/signal processing unit 21 is higher than the target voltage (when the temperature of the wavelength converting element is higher than the target value). The Peltier drive circuit 24, upon reception of a voltage lower than the reference voltage, supplies a negative current according to the level of the voltage to the Peltier element 15. Accordingly, the temperature of the Peltier element 15 is decreased, and hence heat absorption effect is provided, whereby the temperatures of the wavelength converting elements 13 are decreased correspondingly.

On the other hand, when the output voltage of the amplifier/signal processing unit 21 is lower than the target voltage (when the temperatures of the wavelength converting elements are lower than the target value), the comparator circuit 23 outputs a voltage higher than the predetermined reference voltage to the Peltier drive circuit 24. The Peltier drive circuit 24, upon reception of the voltage higher than the reference voltage, supplies a positive current according to the level of the voltage to the Peltier element 15. Accordingly, the Peltier element 15 generates heat to increase the temperature of the wavelength converting element 13. Consequently, the temperatures of the respective wavelength converting elements 13 are kept at a temperature at which the conversion efficiency becomes the substantially maximum value.

Therefore, according to the laser source device 1 of this embodiment, the temperatures of the respective wavelength converting elements 13 can be preferably controlled, and the conversion efficiencies of the respective wavelength converting elements 13 can be maintained at a high level. According to the laser source device 1, temperature control can be achieved independently for each wavelength converting element 13. Therefore, even when the respective lasers 12 have different wavelengths depending on the lines corresponding to the respective wavelength converting elements 13, the conversion efficiencies of the respective wavelength converting elements 13 can be maintained at a high level. According to the laser source device 1, even when the areas for arranging the respective lasers 13, which constitute two-dimensional laser arrays, are large in width, it is not necessary to forcedly increase the thickness of each wavelength converting element 13. Therefore, the efficient and adequate temperature control can be achieved for the light source including the two-dimensional laser array and the wavelength converting element 13 while restraining the increase in manufacturing cost.

Second Embodiment

Figure 3:
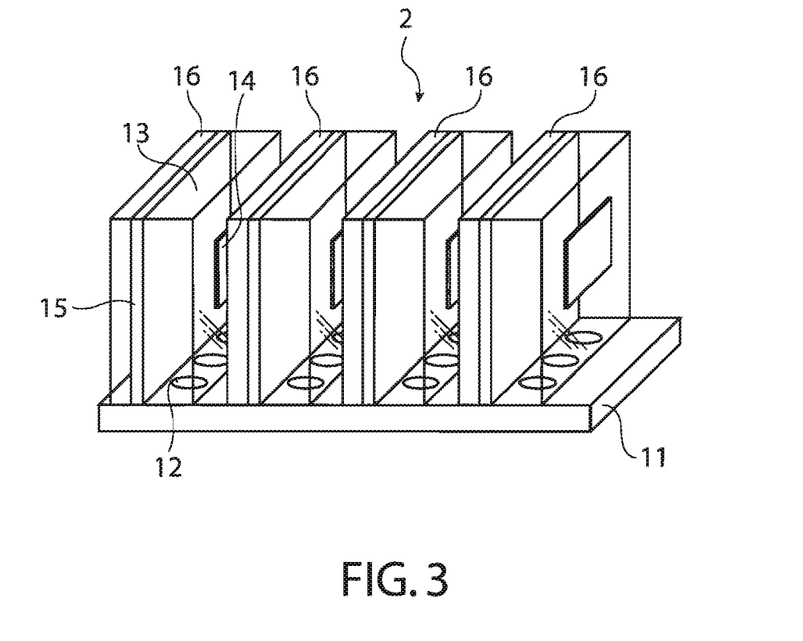
FIG. 3 is a schematic perspective view showing an example of a laser source device according to a second embodiment of the invention.

FIG. 3 is a schematic perspective view showing an example of a laser source device 2 according to a second embodiment of the invention.

In FIG. 3, the same components as in the first embodiment are represented by the same reference numerals. The laser source device 2 in the second embodiment is different from the laser source device 1 in the first embodiment in that heat shielding structures 16 are arranged between the respective adjacent wavelength converting elements 13.

In other words, the heat shielding structures 16 are adhered to the entire surfaces of the respective Peltier elements 15 opposing to the surfaces having the wavelength converting elements 13 adhered thereto. The respective heat shielding structures 16 and the adjacent wavelength converting elements 13 are apart from each other. The adjacent wavelength converting element 13 means the wavelength converting element 13 next to the wavelength converting element 13 which is controlled in temperature by the Peltier element 15 having the heat shielding structure 16 adhered thereto. Various members having low heat conductivity can be applied as the heat shielding structure 16 such as a porous composite material, an organic laminated plate, an inorganic laminated plate, ceramics, and so on. The space between the adjacent wavelength converting elements 13 can also provide heat shielding effect as the function of the heat shielding structure 16.

Therefore, according to the laser source device 2 according to the second embodiment, heat shielding between the respective adjacent wavelength converting elements 13 is achieved, and hence the respective wavelength converting elements 13 can be controlled in temperature at different reference temperatures (target voltages) respectively. Therefore, for example, even when the wavelength or the temperature characteristics of the lasers 12 are different for each two-dimensional laser array, the conversion efficiencies of all the wavelength converting elements 13 can be enhanced to the respective desired levels or even higher. Even when the wavelength of the laser 12 is fluctuated in each two-dimensional laser array according to the depending on the manufacturing processes, the conversion efficiencies of all the wavelength converting elements 13 can be enhanced to the respective desired levels or even higher.

Third Embodiment

Figure 4:
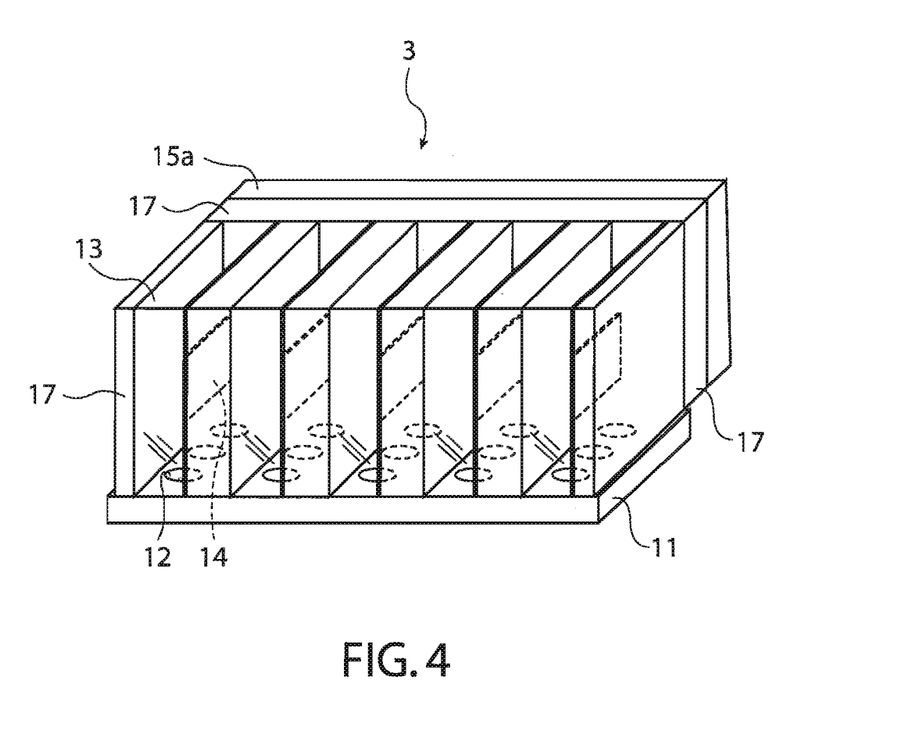
FIG. 4 is a schematic perspective view showing an example of a laser source device according to a third embodiment of the invention.

FIG. 4 is a schematic cross-sectional view showing an example of a laser source device 3 according to a third embodiment of the invention. In FIG. 4, the same components as those in FIG. 1 are represented by the same reference numerals. The laser source device 3 in the third embodiment is different from the laser source device 1 according to the first embodiment in that copper plates (heat conductive members) 17 are arranged between the respective adjacent wavelength converting elements 13.

In other words, a plurality of the copper plates 17 are arranged so as to sandwich the respective wavelength converting elements 13. One surface of each copper plate 17 is hermetically adhered to one of the wavelength converting element 13, and the other surface opposing to the one surface thereof is hermetically adhered to the next wavelength converting element 13. End surfaces of the respective wavelength converting elements 13 and the respective copper plates 17 arranged so as to sandwich the respective wavelength converting elements 13 on one side are connected to or in contact with one common copper plate 17. Various members that is low in heat resistance (high in heat conductivity) can be applied to the copper plate 17. In the laser source device 3, the temperatures of all the wavelength converting elements 13 are controlled by one Peltier element 15a connected to the common copper plate 17.

Therefore, according to the laser source device 3 in the third embodiment, the respective wavelength converting elements 13 can be thermally connected by the copper plates 17, whereby the temperature of the respective wavelength converting elements 13 can be equalized. Therefore, for example, when the wavelengths and the temperature characteristics of the lasers 12 in the respective rows that constitute the two-dimensional laser arrays are substantially the same, the conversion efficiencies of all the wavelength converting elements 13 can be enhanced to the desired levels or even higher.

Fourth Embodiment

Figure 5:
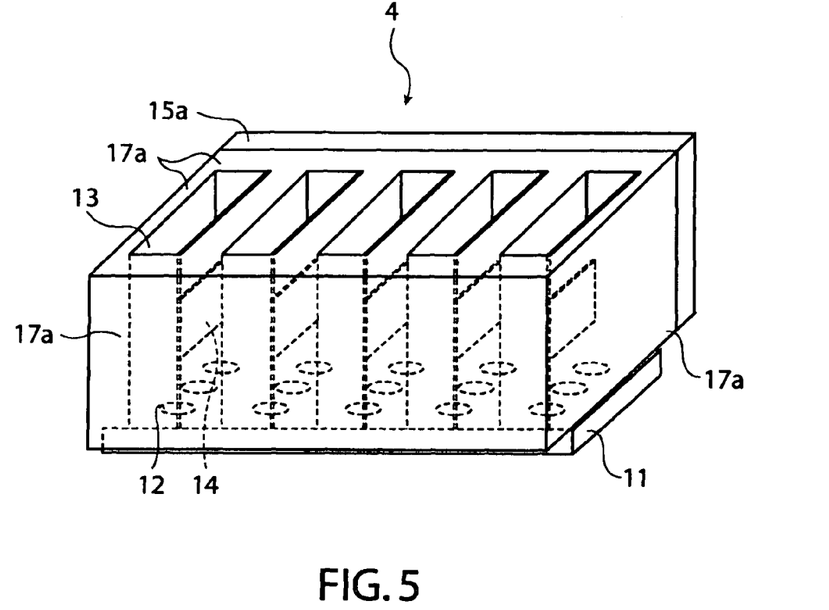
FIG. 5 is a schematic perspective view showing an example of a laser source device according to a fourth embodiment of the invention.

FIG. 5 is a schematic perspective view of an example of a laser source device 4 according to a fourth embodiment of the invention. In FIG. 5, the same components as in FIG. 1 and FIG. 4 are represented by the same reference numerals. The laser source device 4 in the fourth embodiment is different from the laser source device 1 according to the first embodiment in that a copper plate 17a having a plurality of through-holes is provided, and the wavelength converting elements 13 and the temperature sensors 14 are inserted into the through-holes respectively.

In other words, one of the wavelength converting elements 13 and one of the temperature sensors 14 are inserted into each through-hole of the copper plate 17a as one set. The wavelength converting elements 13 are thermally adhered to side surfaces of the through-holes of the copper plates 17a. Various members having low heat resistance can be applied to the copper plate 17a. In the laser source device 4, the temperatures of all the wavelength converting elements 13 are controlled by one Peltier element 15a connected to the copper plate 17a.

Therefore, according to the laser source device 4 in the fourth embodiment, the side surfaces of the through-holes of the copper plate 17a can be hermetically adhered to the most part of the exposed surfaces of the respective wavelength converting elements 13. Therefore, the temperatures of the respective wavelength converting elements 13 can be equalized preferably to a desired value.

Fifth Embodiment

Figure 6:
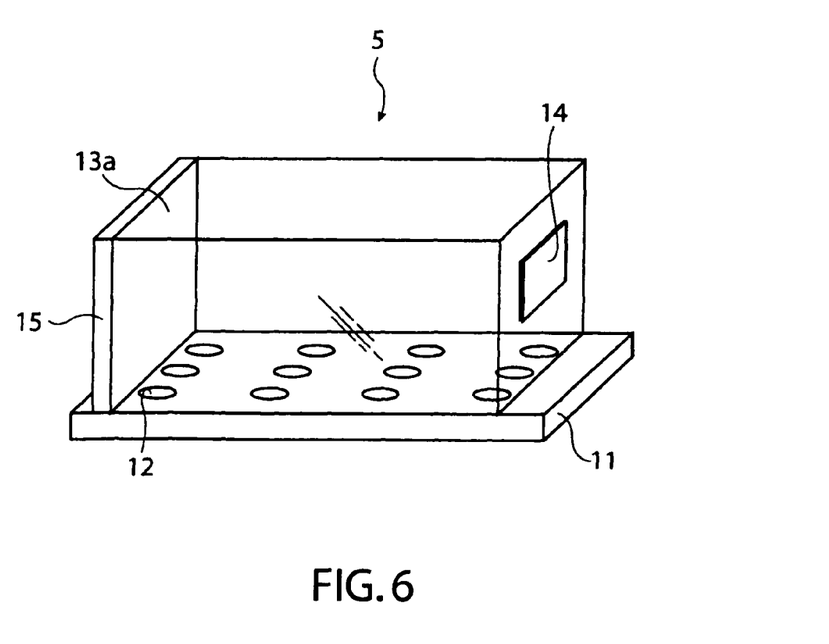
FIG. 6 is a schematic perspective view showing an example of a laser source device according to a fifth embodiment of the invention.

FIG. 6 is a schematic perspective view showing an example of a laser source device 5 according to a fifth embodiment of the invention. In FIG. 6, the same components as in FIG. 1 are represented by the same reference numerals. The laser source device 5 in the fifth embodiment is different from the laser source device 1 according to the first embodiment in that a wavelength converting element 13a, which is a single mono-structure, that the light beams emitted respectively from all the plurality of lasers 12 that constitute the two-dimensional laser arrays commonly enter is provided. The wavelength converting element 13a is a single thicker mono-structure in comparison with the wavelength converting elements 13 shown in FIG. 1, and has a bulk shape. Then, a single Peltier element 15 is mounted to the wavelength converting element 13a.

According to the laser source device 5 in the fifth embodiment, the wavelengths of all the laser beams emitted from the two-dimensional laser arrays can be converted with a single wavelength converting element 13a. The temperature of the one single wavelength converting element 13a can be controlled by the set of temperature sensor 14 and the Peltier element 15. Therefore, the laser source device 5 can be formed into a simple structure, and miniaturization and reduction in manufacturing cost are achieved.

Sixth Embodiment

Figure 7:
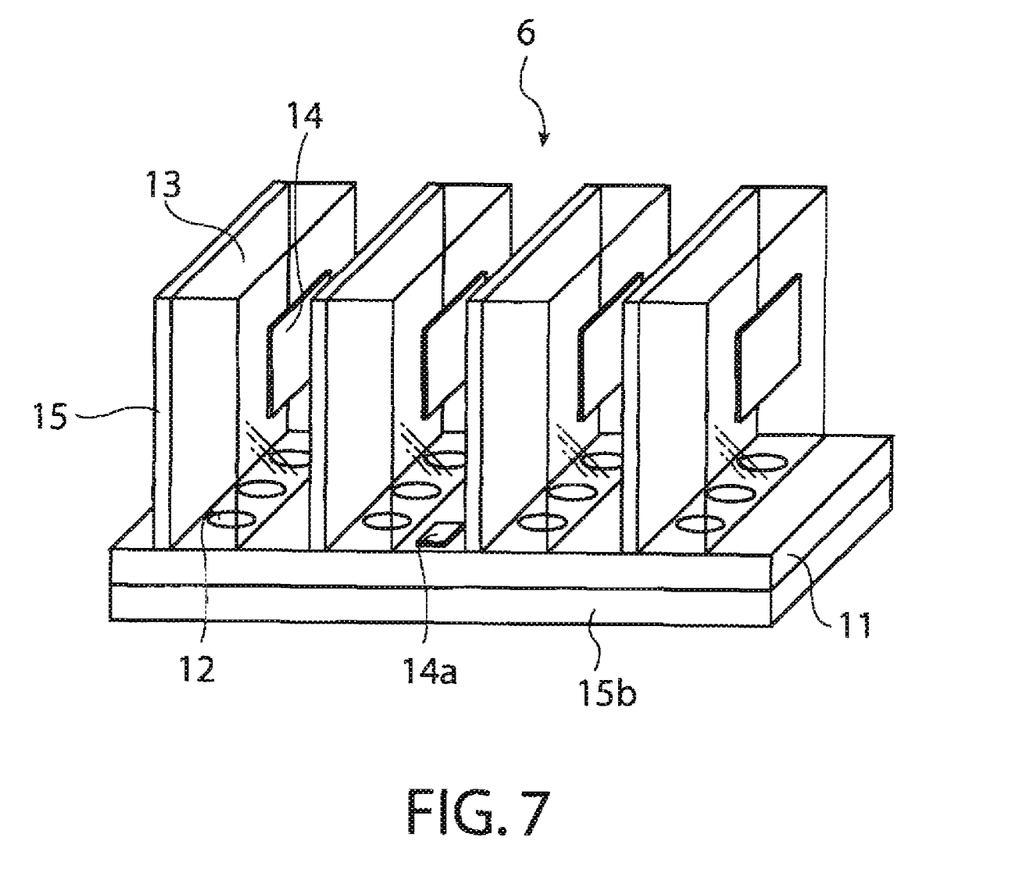
FIG. 7 is a schematic perspective view showing an example of a laser source device according to a sixth embodiment of the invention.

FIG. 7 is a schematic perspective view showing an example of a laser source device 6 according to a sixth embodiment of the invention. In FIG. 7, the same components as in FIG. 1 are represented by the same reference numerals. The laser source device 6 in the sixth embodiment is different from the laser source device 1 in the first embodiment in that a laser temperature sensor 14a that detects the temperature of the laser 12 and a Peltier element (laser temperature controlling means) 15*b* that controls the temperature of the laser 12 on the basis of the output from the laser temperature sensor 14*a* are provided.

The laser temperature sensor 14*a* is, for example, the temperature sensor arranged on the substrate 11 in the vicinity of the laser 12. The Peltier element 15*b* is arranged on a surface of the substrate 11 on the opposite side from a side where the laser 12 and the wavelength converting elements 13 are arranged. The Peltier element 15*b* is thermally adhered to the surface on the opposite side.

Figure 8:
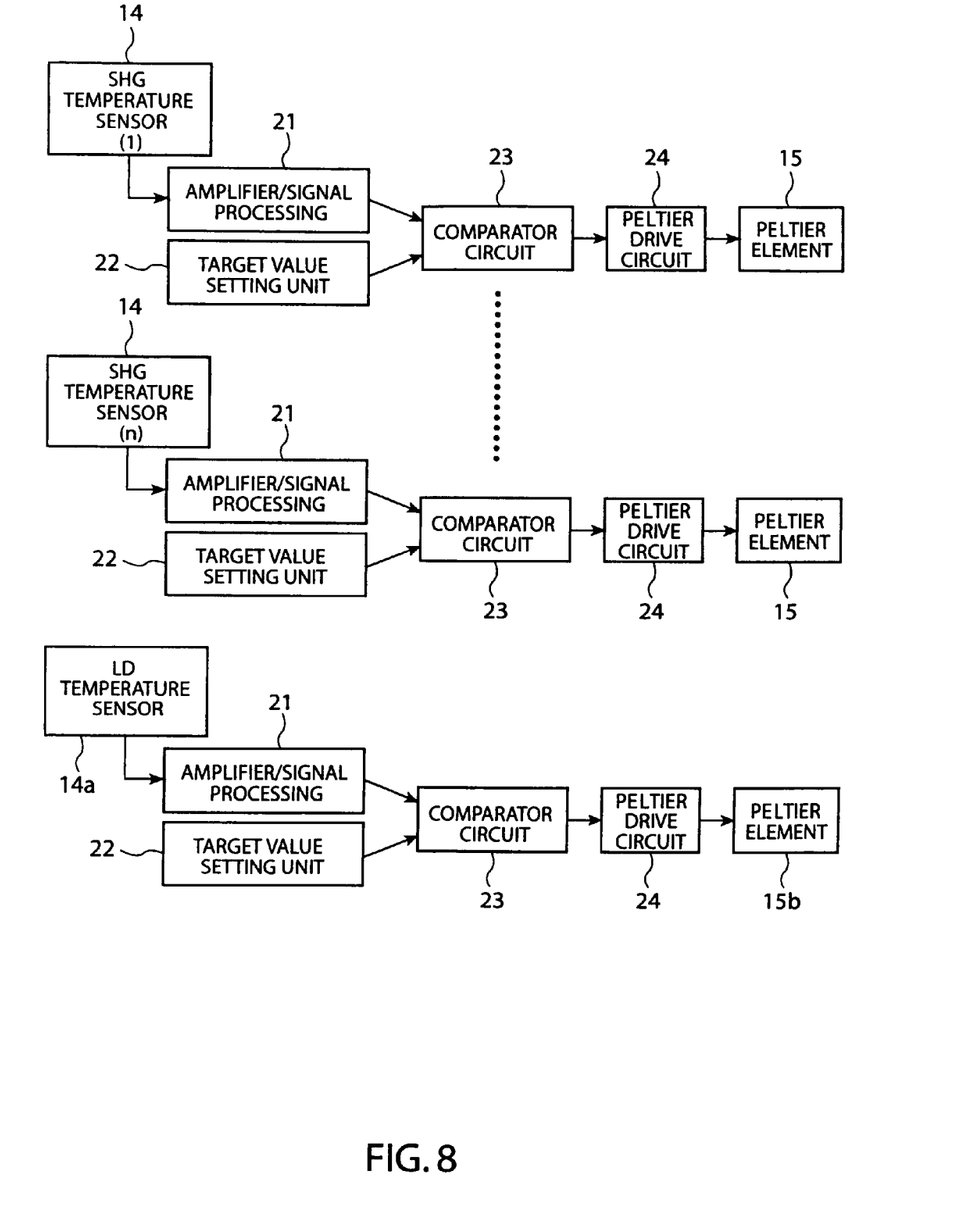
FIG. 8 is a circuit drawing showing an example of temperature controlling means in the laser source device shown in FIG. 7.

FIG. 8 is a circuit drawing showing an example of the temperature controlling means in the laser source device 6 shown in FIG. 7. In FIG. 8, the same components as the temperature controlling means in the laser source device 1 shown in FIG. 2 are represented by the same reference numerals. The temperature controlling means in the laser source device 6 includes the temperature controlling means for a wavelength converting element that controls the temperature for the respective wavelength converting elements 13 and the laser temperature controlling means for controlling the temperature of the laser 12.

The temperature controlling means for a wavelength converting element is the same as the temperature controlling means shown in FIG. 2, and includes the temperature sensor 14 for the wavelength converting element 13, the Peltier element 15 for the wavelength converting element 13, the amplifier/signal processing unit 21, the target value setting unit 22, the comparator circuit 23, and the Peltier drive circuit 24. The laser temperature controlling means includes the temperature sensor 14*a* for the lasers 12, the Peltier element 15*b* for the lasers 12, the amplifier/signal processing unit 21, the target value setting unit 22, the comparator circuit 23, and the Peltier drive circuit 24 for the wavelength converting elements 13.

Therefore, according to the laser source device 6 in the sixth embodiment, the temperature control of the lasers 12 can also be performed in addition to the temperature control of the wavelength converting elements 13. Therefore, for example, the temperatures of the lasers 12 can be controlled so that the lasers 12 emit laser beams with wavelengths that achieve high conversion efficiency for the wavelength converting elements 13, whereby the conversion efficiency of the wavelength converting elements 13 can further be improved stably.

In the sixth embodiment, the laser temperature sensor 14*a* and the laser Peltier elements 15*b* can be arranged for each laser 12. In this arrangement, even when the wavelengths or the temperature characteristics fluctuate from the laser 12 to laser 12, the temperatures of the lasers 12 can be controlled individually so that the respective lasers 12 emit laser beams with wavelengths that achieve high conversion efficiency for the wavelength converting elements 13.

Display Device

Subsequently, an embodiment of a display device employing one of the laser source devices 1 to 6 will be described.

Figure 9:
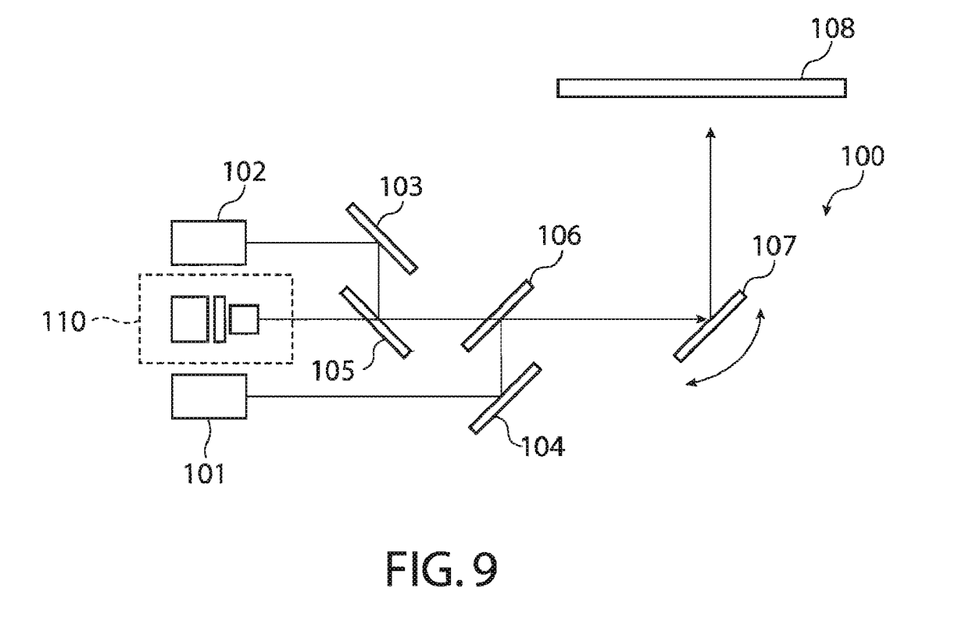
FIG. 9 is a drawing showing a schematic structure of an example of a scanning display device according to an embodiment of the invention.

FIG. 9 is a drawing showing a schematic structure of a full color scanning display device 100, which corresponds to the display device in this embodiment. The scanning display device 100 includes a light source including a red light source 102, a green light source 110 and a blue light source 101, a reflection plate 103 that reflects red light, a reflection plate 104 that reflects blue light, a dichroic mirror 105 that transmits green light and reflects red light, a dichroic mirror 106 that transmits green light and reflects blue light, a scanning mirror 107 that scans a light beam from the light source, and a display board 108 that projects the light from the scanning mirror 107 as a screen image.

The red light source 102, the green light source 110 and the blue light source 101 are composed of any one of the laser source devices 1 to 6 shown in FIG. 1 to FIG. 8 respectively.

Red light emitted from the red light source 102 is reflected by the reflection plate 103 and the dichroic mirror 105, is transmitted through the dichroic mirror 106 and introduced to the scanning mirror 107. Blue light emitted from the blue light source 101 is reflected by the reflection plate 104 and the dichroic mirror 106, and is introduced to the scanning mirror 107. Green light emitted from the green light source 110 is transmitted through the dichroic mirror 105 and the dichroic mirror 106, and is introduced to the scanning mirror 107. In the scanning mirror 107, scanning is performed according to the screen image to be projected on the display board 108.

According to the scanning display device 100 in this embodiment, a high-definition and high-quality full color display is achieved, and miniaturization, reduction of power consumption and cost are realized.

In the embodiment of the scanning display device described above, an example in which the dichroic mirror is used as a photosynthesizing unit, and the scanning mirror 107 is used as a scanning unit is shown. However, a structure in which the photosynthesizing unit is not provided, and the scanning mirrors are provided for each color is also applicable.

Projector

Subsequently, an embodiment of a projector in which any one of the laser source devices 1 to 6 is employed will be described.

Figure 10:
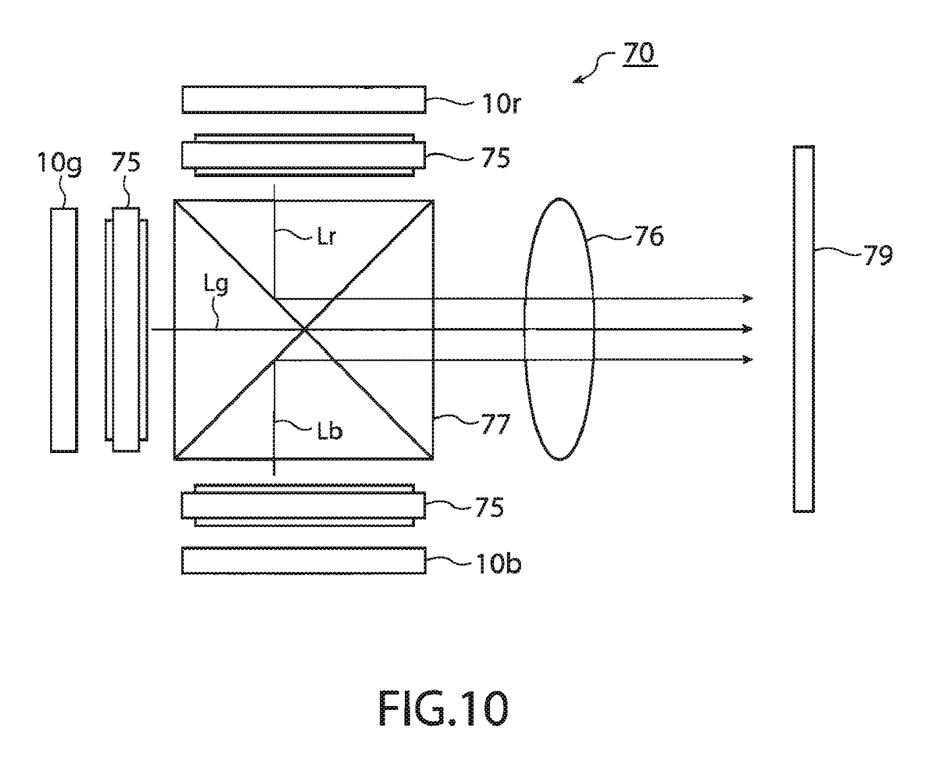
FIG. 10 is drawing showing a schematic structure of an example of a projector according to the invention.

FIG. 10 is a schematic structure of a projector 70 in this embodiment, showing an example of a three-plate system. The projector 70 includes three light sources; an array light source 10*r* that emit red (R) light arranged into a two-dimensional array, an array light source 10*g* including semiconductor lasers that emit green (G) light, and an array light source 10*b* including semiconductor lasers that emit blue (B) light arranged into a two-dimensional array.

The array light source 10*r*, the array light source 10*g* and the array light source 10*b* are composed of any one of the laser source devices 1 to 6 shown in FIG. 1 to FIG. 8 respectively.

The light beams emitted from the respective array light sources 10*r*, 10*g* and 10*b* are irradiated onto liquid crystal light valves 75. In other words, the liquid crystal light valves 75 that modulate the respective color beams of R, G and B are provided on the outgoing sides of the respective array light sources 10*r*, 10*g* and 10*b* respectively. The light beams of three colors modulated by the respective liquid crystal light valves 75 enter into a cross dichroic prism (color synthesizing means) 77. The prism 77 includes four rectangular prisms adhered to each other, and formed with a dielectric multi-layer film that reflects red light and a dielectric multi-layer film that reflects blue light arranged in a crossed state on the inner surface thereof. Light beams of three colors Lr, Lg, Lb are synthesized with the dielectric multi-layer film, and a light beam that represents a color image is formed. The light beam after the color synthesis is projected on a screen 79 by a projection lens 76 (projection device), and an enlarged image is displayed.

According to the projector 70 in this embodiment, a high-definition and high-quality full color display is achieved, and miniaturization, reduction of power consumption and cost are realized.

In the above-described projector, an example including the three liquid crystal light valves as a light modulating device and the cross dichroic prism as the color synthesizing means has been shown. However, it is also possible to employ a structure in which the color synthesizing means is not provided and the semiconductor lasers that emit light beams of the respective colors are arranged in the array light sources, so that the respective color beams are emitted in temporary sequence, whereby the beams of the respective colors are modulated by a single liquid crystal light valve in temporary sequence. Although the example in which the light-transmissive liquid crystal light valve is employed has been shown as the light modulating device, it is also possible to employ a reflective liquid crystal light valve, a DMD or a diffraction grating light valve or the like may be employed.

The technical scope of the invention is not limited to the embodiments, and various modifications can be made without departing the scope of the invention.

The entire disclosure of Japanese Patent Application No. 2005-179253, filed Jun. 20, 2005 is expressly incorporated by reference herein.

What is claimed is:

1. A laser source device comprising:
    a plurality of lasers arranged in an array;
    wavelength converting elements that convert wavelengths of a plurality of light beams emitted from the plurality of lasers, the wavelength converting elements being shaped in the form of plates, an end surface of each of the plates being arranged so as to oppose light emitting ports of the plurality of lasers;
    a plurality of temperature sensors that respectively detect the temperatures of each of the wavelength converting elements, the temperature sensors being arranged on first sides of the plates of the wavelength converting elements;
    a plurality of temperature adjusting units respectively arranged on second sides of the plates of the wavelength converting elements;
    a temperature controller that controls the temperature adjusting units so as to control the temperatures of the wavelength converting elements on the basis of outputs of the temperature sensors;
    heat-shielding structures or clearances arranged between the wavelength converting elements; and
    a heat conductive member being a member having low heat resistance and having a plurality of through-holes in which the wavelength converting elements and the temperature sensors arranged for the respective laser arrays are inserted,
    wherein the wavelength converting elements and the temperature sensors are thermally adhered to side surfaces of the through-holes.

2. The laser source device according to claim 1, wherein the plurality of lasers constitute laser arrays in which the lasers are arranged to form one or more rows on the same substrate, and each wavelength converting element is a waveguide type wavelength converting element and is a mono-structure that light beams emitted from the plurality of lasers commonly enter.

3. The laser source device according to claim 1, wherein the plurality of lasers constitute two-dimensional laser arrays arranged so as to form a plurality of rows on the same substrate,
    the wavelength converting elements are a plurality of mono-structures each arranged for each two-dimensional laser array, the mono-structures are arranged so that light beams emitted from the plurality of lasers arranged in an array enter commonly, the temperature sensors and the temperature adjusting units are arranged for each mono-structure arranged for each array, and
    the temperature controller controls the temperature adjusting unit arranged for each mono-structure so as to control the temperature of the mono-structure on the basis of an output from the temperature sensor arranged on the same mono-structure.

4. The laser source device according to claim 3 further comprising:
    heat conductive members, which are members of low heat resistance, arranged between the adjacent wavelength converting elements arranged for the respective two-dimensional laser arrays.

5. The laser source device according to claim 4,
    wherein the heat conductive members are formed of a copper plate, and
    the temperature adjusting units are formed together as a single temperature adjusting unit adhered to the copper plate.

6. The laser source device according to claim 1, the plurality of lasers constitute two-dimensional laser arrays dispersed on a two-dimensional plane on the same substrate, and the plurality of wavelength converting elements forming a single mono-structure that light beams emitted from all the plurality of lasers that constitute the two-dimensional laser arrays enter commonly.

7. The laser source device according to claim 1 comprising:
    a laser temperature sensor that detects the temperature of the lasers and
    a laser temperature controlling unit that controls the temperature of the lasers on the basis of an output from the laser temperature sensor.

8. A display device comprising:
    the laser source device according to claim 1.

9. A display device of a scanning type comprising: a red light source;
    a green light source;
    a blue light source; and
    a scanning unit that scans light beams from the light sources of the respective colors to display a screen image,
    wherein the light source of at least one color includes the laser source device according to claim 1.

10. A projector comprising;
    the laser source device according to claim 1;
    a light modulating device that modulates a light beam emitted from the laser source device; and
    a projecting device that projects the light beam modulated by the light modulating device.

11. The laser source device according to claim 1, wherein the temperature adjusting units comprise at least one of heating units and cooling units.

12. The laser source device according to claim 1, wherein the heat conductive member is formed of a copper plate, and the temperature adjusting units are formed together as a single temperature adjusting unit and adhered to the copper plate.

13. The laser source device according to claim 6, wherein the temperature adjusting units are formed together as a single temperature adjusting unit.

* * * * *